(12) United States Patent
Villevieille et al.

(10) Patent No.: US 6,434,400 B1
(45) Date of Patent: Aug. 13, 2002

(54) METHOD AND APPARATUS FOR DATA COMMUNICATION USING A MULTI-NUMBER MOBILE TELEPHONE

(75) Inventors: Jean-Marc Villevieille, Arizona; Michael A. Miller, Chandler, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/030,326

(22) Filed: Feb. 25, 1998

(51) Int. Cl.⁷ .......................... H04B 1/38; H04M 11/00; G08G 1/123
(52) U.S. Cl. .......................... 455/550; 455/99; 455/454; 340/988; 340/991; 379/100.15
(58) Field of Search .................. 455/99, 404, 410, 455/456, 457, 521, 551, 575, 550, 422, 553; 340/988, 989, 991, 993; 379/100.14, 100.15, 100.16, 93.09

(56) References Cited

U.S. PATENT DOCUMENTS

| 4,677,653 A | * | 6/1987 | Weiner et al. ............... 455/551 |
| 4,745,632 A | * | 5/1988 | Duffy .......................... 455/550 |
| 4,773,080 A | * | 9/1988 | Nakajima et al. ........... 375/216 |
| 4,809,316 A | * | 2/1989 | Namekawa .................. 455/404 |
| 4,823,373 A | * | 4/1989 | Takahashi et al. .......... 455/553 |
| 4,926,464 A | * | 5/1990 | Schley-may ............. 379/93.37 |
| 5,444,761 A | * | 8/1995 | Nagashima ................. 455/556 |
| 5,530,736 A | * | 6/1996 | Comer et al. ............... 455/458 |
| 5,572,204 A | * | 11/1996 | Timm et al. ................ 340/988 |
| 5,966,430 A | * | 10/1999 | Yoshida ................. 379/100.15 |
| 5,983,095 A | * | 11/1999 | Cameron ..................... 455/414 |
| 6,119,003 A | * | 9/2000 | Kukkohovi ................. 455/435 |
| 6,125,283 A | * | 9/2000 | Kolev et al. ................ 455/552 |
| 6,226,529 B1 | * | 5/2001 | Bruno et al. ................ 455/557 |

* cited by examiner

Primary Examiner—Vivian Chin
Assistant Examiner—Charles N. Appiah
(74) Attorney, Agent, or Firm—Nicholas C. Hopman; John J. King; Kevin D. Wills

(57) ABSTRACT

A first data communication method comprises a step (201) of automatically directing a mobile telephone (24) to switch operation from a first telephone number to a second telephone number to receive a data call placed to the second telephone number. A second data communication method comprises a step (301) of automatically directing the mobile telephone (24) to switch from the first telephone number to the second telephone number to place a security call using the second telephone number. A data communication apparatus comprises a controller (40) to direct the mobile telephone (24) to perform the aforementioned methods.

16 Claims, 3 Drawing Sheets

METHOD AND APPARATUS FOR DATA COMMUNICATION USING A MULTI-NUMBER MOBILE TELEPHONE

CROSS-REFERENCE TO RELATED APPLICATION

The present application is related to the following application: "VEHICLE SECURITY METHOD AND APPARATUS HAVING A VALET MODE", having Ser. No. 09/030,155 filed Feb. 25, 1998.

The subject matter of the above-identified related application is hereby incorporated by reference into the disclosure of this application.

FIELD OF THE INVENTION

The present invention relates to methods and systems for communicating data in a monitoring system such as a vehicle security system.

BACKGROUND OF THE INVENTION

In a vehicle messaging system, such as an emergency messaging system or a vehicle security system, a central station contacts a subscriber telephone in a vehicle to download and/or upload data associated with the vehicle. The data can include vehicle tracking data and/or theft reporting data, or other data pertinent to the vehicle or its operator.

At times, the central station may need to contact the subscriber telephone when the vehicle is unpowered. To be prepared to receive a data download call from the central station, the subscriber telephone can be continually powered by a battery of the vehicle. A shortcoming of this approach is that the subscriber telephone drains energy from the battery for a potentially long duration of time (e.g. many hours) while the vehicle is unpowered. Hence, a potentially significant amount of energy may be drained from the battery using this approach, which makes it impractical.

Another known approach is to have the subscriber telephone powered-on responsive to a vehicle door handle. An electrical contact can be sensitive to use of a driver-side door handle, for example, to recognize an open vehicle door. The subscriber telephone is powered-on in response to the electrical contact. This approach requires a driver, or vehicle operator, to be present which can be impractical.

A further known approach is to have the subscriber telephone powered-on responsive to a pager device in the vehicle. The central station initiates a paging message to the pager when a data download call is to occur. The subscriber telephone is powered-on in response to the pager receiving the paging message. Thereafter, the subscriber telephone automatically answers an ensuing incoming call from the central station. After communicating data to the central station in the call, the subscriber telephone is returned to an unpowered state.

A shortcoming of any known automatic answering scheme is that the subscriber telephone can automatically answer a non-download call. For example, a caller (e.g. another person) may initiate a call to a driver or a passenger of the vehicle which is automatically answered by the subscriber telephone. By automatically answering the call, the caller and/or the subscriber may be charged for the call even though neither the driver nor the passenger is present to answer.

Another shortcoming is that if the driver is present in the vehicle when a data call comes in, the driver or a passenger may pick up a handset of the subscriber telephone. This action can interrupt the data call, and can generate an associated charge to the subscriber.

What is needed is an improved approach to handling voice and data calls in a vehicular emergency messaging system, both when an operator is present and when an operator is absent, including optimum energy preservation and prevention of improper automatic answering.

DETAILED DESCRIPTION OF THE PREFERRED EMBODIMENT

Embodiments of the present invention provide a method and apparatus, or system, for data communication using a multi-number capable mobile telephone. The mobile telephone is directed to switch operation from a first telephone number to a second telephone number to receive calls at predetermined times from a central station. The mobile telephone is powered at the predetermined times to receive the data calls.

Figure 1:
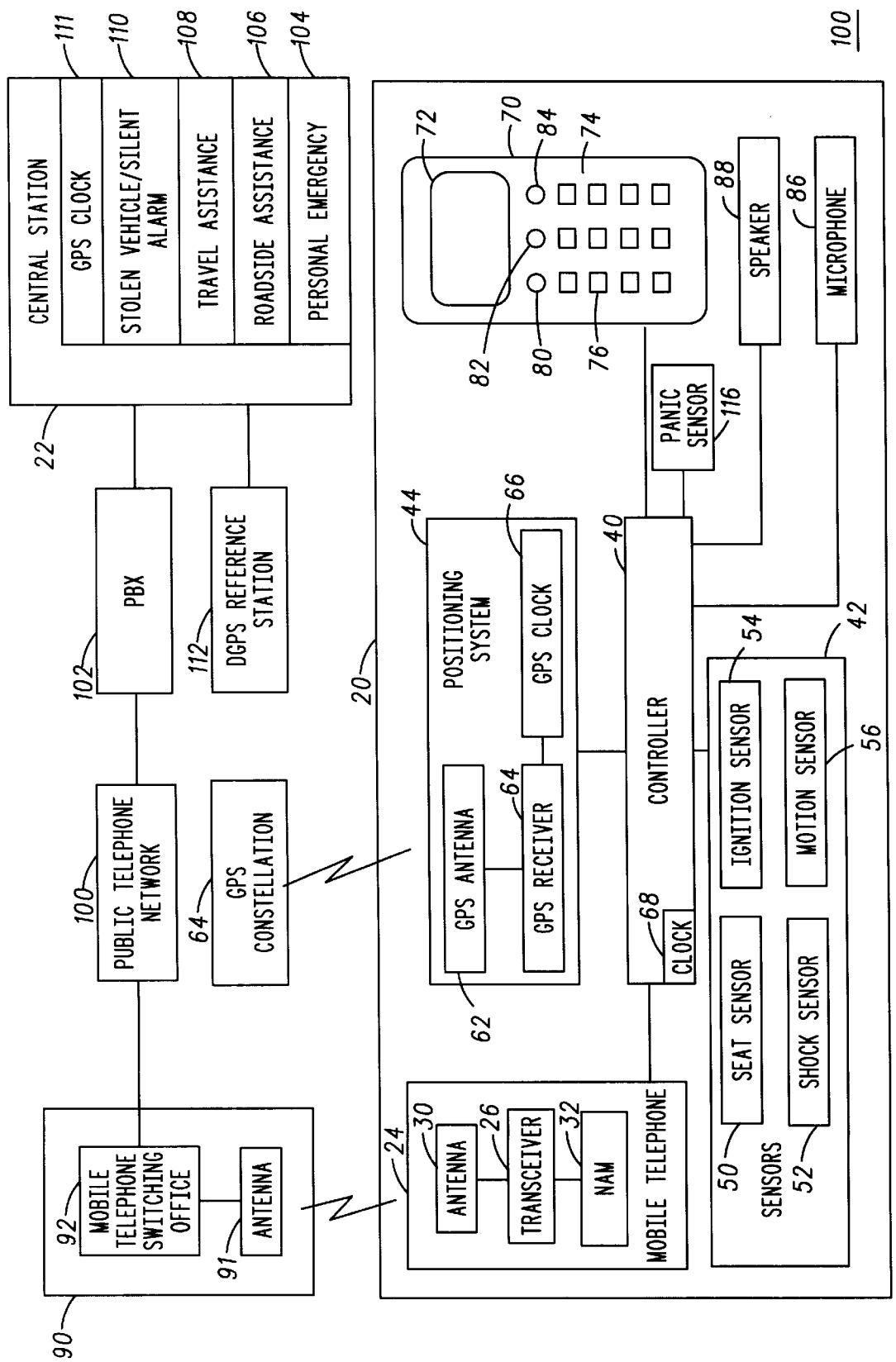
FIG. 1 is a block diagram of an embodiment of a system for communicating data from a mobile, or subscriber, station to a central station in accordance with a preferred embodiment of the invention.

FIG. 1 is a block diagram of an embodiment of a system 100 for communicating data from a mobile station 20 to a central station 22. Typically, the mobile station 20 is positioned within or otherwise associated with a vehicle. Preferably, the mobile station 20 provides a vehicle monitoring apparatus or a like security apparatus for the vehicle.

The central station 22 provides or assists in providing services, such as a tracking service or a theft reporting service, based upon the data received from the mobile station 20. The central station 22 typically provides the services to a plurality of mobile stations (e.g. a plurality of vehicles) including the mobile station 20.

The mobile station 20 includes a mobile telephone 24 having a transceiver 26 and an antenna 30. The mobile telephone 24 preferably includes a cellular telephone having a cellular transceiver and a cellular antenna. Alternatively, the mobile telephone 24 can include an alternative radio telephone such as a personal communications system telephone or a satellite telephone.

The transceiver 26 is operative/responsive to a number assignment module (NAM) 32. The number assignment module 32 provides a plurality of telephone numbers, or like telecommunication codes, for the mobile telephone 24. Preferably, the number assignment module 32 includes a dual-NAM to provide a first telephone number and a second telephone number for the mobile telephone 24. In general, the number assignment module 32 can include a multi-number assignment module to provide a plurality of telephone numbers for the mobile telephone 24.

The mobile telephone 24 is responsive to a controller 40. The controller 40 includes a microcontroller, a microprocessor, or a like processor to direct the operation of the mobile station 20. The controller 40 provides or assists in providing various vehicle security features such as vehicle alarm, vehicle theft reporting, vehicle tracking, roadside assistance, travel assistance, and personal emergency features. The controller 40 provides the features based upon vehicle data received from one or more sensors 42 and a positioning system 44.

The sensors 42 can include various vehicle alarm sensors including but not limited to a seat sensor 50, a shock sensor 52, an ignition sensor 54, and a motion sensor 56. Optionally, the sensors 42 can include other sensors such as an airbag sensor and/or a crash sensor. In general, the sensors 42 provide data indicating an operating or environmental state or condition of the vehicle.

The positioning system 44 is used to determine a position of the vehicle. Preferably, the positioning system 44 includes a Global Positioning Satellite (GPS) receiver 60 and an associated GPS antenna 62. In this case, the positioning system 44 determines the geographical position of the vehicle based upon signals received from a plurality of satellites such as a GPS constellation 64. It is noted, however, that alternative positioning systems are also within the scope of the approach described herein.

The GPS receiver 60 also provides a GPS clock 66 to determine a time based upon signals received from the GPS constellation 64. The GPS clock 66 is used to synchronize a clock 68 maintained by the controller 40. Preferably, the clock 68 is synchronized by the GPS clock 66 each time the system 100 is activated.

Overall, the GPS receiver 60 and the GPS clock 66 can provide data such as time, date, position, quality, velocity, heading, and a list of satellites used for a position fix.

A handset 70 is operatively coupled with the mobile telephone 24. The handset 70 can include a cellular handset having a display 72 and a user input device 74. Preferably, the display 72 includes a liquid crystal display to display visible information to an end user. The user input device 74 preferably includes a mobile telephone keypad 76, such as a cellular telephone keypad, augmented with a plurality of service buttons. The service buttons can include a personal emergency button 80, a roadside assistance button 82, and a travel assistance button 84.

The controller 40 operates responsive to activation of the telephone keypad 76 to provide standard cell phone type features using the mobile telephone 24. Examples of standard mobile telephone features include, but are not limited to, dialing a telephone number, initiating an outgoing call, answering an incoming call, and terminating a call.

An audio input device such as a microphone 86, and an audible output device such as a speaker 88 are operatively associated with the mobile telephone 24. The microphone 86 and the speaker 88 facilitate voice or other audible communications using the mobile telephone 24. The microphone 86 and the speaker 88 can be integrated with or otherwise associated with the handset 70, or can be mounted in the vehicle for hands-free operation.

The mobile telephone 24 communicates with a mobile telephone infrastructure 90 to provide mobile communications. The mobile telephone infrastructure 90 can include one or more cellular telephone antennas 91 and one or more mobile telephone switching offices 92.

The controller 40 is responsive to the service buttons 80, 82, and/or 84 to initiate service-specific features in cooperation with the central station 22. In these cases, the mobile telephone 24 and the central station 22 communicate via the mobile telephone infrastructure 86 and a public telephone network 100 and/or a private branch exchange 102. Service-specific features can include a visible component displayed by the display 72 or another display, and/or an audible component presented by the speaker 88.

A user-initiated selection of the personal emergency button 80 initiates a personal emergency call directed to the central station 22. The personal emergency call can be placed using either the first telephone number or the second telephone number. The central station 22 provides one or more personal emergency services 104 for the mobile station 20 in response to receiving the personal emergency call.

A user-initiated selection of the roadside assistance button 82 initiates a roadside assistance call directed to the central station 22. The roadside assistance call can be placed using either the first telephone number or the second telephone number. The central station 22 provides one or more roadside assistance services 106 for the mobile station 20 in response to receiving the call.

A user-initiated selection of the travel assistance button 84 initiates a travel assistance call directed to the central station 22. The travel assistance call can be placed using either the first telephone number or the second telephone number. The central station 22 provides one or more travel assistance services 108 for the mobile station 20 in response to receiving the call.

As described earlier, the controller 40 provides one or more vehicle alarm/security/monitoring features. The controller 40 cooperates with the central station 22 to provide a stolen vehicle/silent alarm feature 110.

The vehicle alarm includes an armed mode and an unarmed mode. The unarmed mode is typically employed while the vehicle is attended by an authorized individual such as the vehicle owner. The armed mode is selected to monitor the vehicle when the vehicle is unattended by an authorized individual. The vehicle is monitored using the sensors 42 and/or the positioning system 44. The armed mode and the unarmed mode are user-selectable using the user input device 74 or another input device. For example, the alarm can be unarmed by entering a personal identification number (PIN) or another code using the user input device 74.

When in the armed mode, the controller 40 maintains the mobile telephone 24 in an unpowered state until communication with the central station 22 is to be performed. At one or more predetermined times, the controller 40 directs the mobile telephone 24 to be powered. The mobile telephone 24 can be powered by the vehicle battery, or alternatively, by a mobile telephone battery.

Preferably, the controller 40 determines when a predetermined time has been attained using the clock 68 synchronized by the GPS clock 66. The central station 22 includes a GPS clock 111 to maintain close synchronization with the clock 68 and the GPS clock 66. The use of the GPS clocks 66 and 111 is advantageous in synchronizing the time referenced by both the central station 22 and the mobile station 20. It is noted, however, that the controller 40 can be responsive to an alternative clock to determine when to power-on the mobile telephone 24. The predetermined times can include a predetermined time of day (such as 2:00 AM, for example), and/or periodic times defined by predetermined time intervals (such as every hour on the hour).

At each predetermined time, the mobile telephone 24 is powered to receive a call from the central station 22. The mobile telephone 24 is directed by the controller 40 to use the second telephone number provided by the number assignment module 32 to receive the call. The central station 22 calls the mobile telephone 24 soon after the predetermined time.

The mobile telephone 24 automatically answers the call from the central station 22. The call provides a bi-directional data/voice communication link between the mobile station 20 and the central station 22. Within the call, the controller 40 communicates data derived from the sensors 42 and/or the positioning system 44 to the central station 22. For example, the data can include position or tracking data for the vehicle and other conditions of the vehicle.

A differential global positioning system (DGPS) reference station 112 can provide a correction signal to improve the accuracy of the position or tracking data. The DGPS reference station 112 can provide delta GPS data such as position change from GPS data, quality, velocity, heading, and a list of satellites used for a position fix. The central station 22 communicates the correction information within the call.

Optionally, audio signals can be communicated within the call. The audio signals can include voice signals sensed by the microphone 86, and communicated from the mobile station 20 to the central station 22. Additionally, the audio signals can include voice signals communicated from the central station 22 to the mobile station 20 for audible presentation using the speaker 88.

After the data have been communicated, the call is terminated. Thereafter, the controller 40 directs that the mobile telephone 24 be unpowered. The mobile telephone 24 is unpowered until a subsequent time to communicate with the central station 22, or until powered when the alarm is unarmed. When unarmed, the mobile telephone 24 reverts to using the first telephone number in the number assignment module 32. The first telephone number is used for outgoing and incoming voice calls by a vehicle occupant when the alarm is unarmed.

In summary, the first telephone number is utilized for standard telephonic communications using the mobile telephone 24. If desired, the first telephone number can be known by others to initiate voice communication with a driver or a passenger of the vehicle. The second telephone number is utilized for communicating data/voice to the central station 22 only. Preferably, the second telephone number is known only by the central station 22.

The controller 40 is responsive to a hidden panic sensor 116 to establish a communication link with the central station 22 in response to a user action. Under a duress situation, for example, a vehicle operator can initiate the communication link without knowledge by an attacker. The communication link is provided by a call placed using either the first telephone number or the second telephone number. The central station 22 can silently monitor audible events within the vehicle as sensed by the microphone 86. If the situation is determined to be safe, the central station 22 can open a two-way conversation with vehicle occupants using the microphone 86 and the speaker 88.

Figure 2:
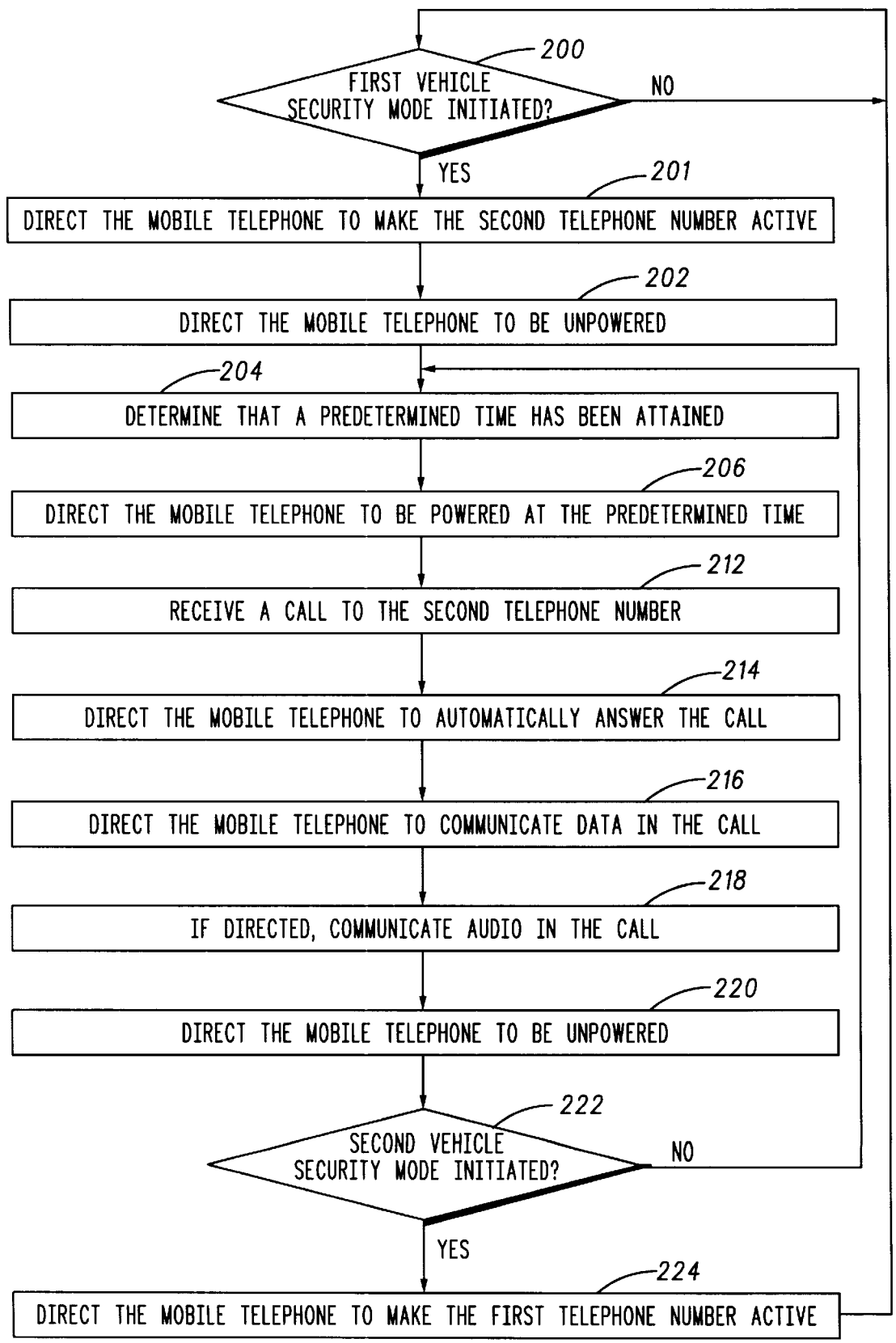
FIG. 2 is a flow chart of an embodiment of a method performed by the mobile station.

FIG. 2 is a flow chart of an embodiment of a method performed by the mobile station 20. Although the method is described with reference to elements of FIG. 1, the method can be performed using alternative elements.

As indicated by block 200, the method includes a step of determining if a first vehicle security mode is initiated. The first vehicle security mode can be initiated by receiving a corresponding user action, such as a depression of one or more buttons on the user input device 74 or another input device. Preferably, the first vehicle security mode comprises a vehicle-unattended mode, i.e. a mode to monitor a vehicle while unattended by an authorized individual. In general, the first vehicle security mode can include any armed or activated alarm mode.

In the first vehicle security mode, a step of directing the mobile telephone 24 to make the second telephone number its active telephone number is performed as indicated by block 201. The controller 40 communicates a control signal to the mobile telephone 24 to perform this step. If the first telephone number was previously active, this step acts to automatically direct the mobile telephone 24 to switch from the first telephone number to the second telephone number.

As indicated by block 202, the controller 40 directs that components of the mobile telephone 24 be unpowered, or powered off. Preferably, at least a portion, and preferably an entire portion, of the transceiver 26 is directed to be unpowered in this step. Components of the mobile telephone 24 remain unpowered until data communication with the central station 22 is to be performed.

As indicated by block 204, the method includes a step of determining that a predetermined data communication time has been attained. The predetermined data communication time is determined to be attained based upon a clock such as the GPS clock 66. The controller 40 compares a time signal from the clock to a set of predetermined data communication times to determine if one of the times has been attained. The set of predetermined data communication times can be maintained in a memory associated with the controller 40.

The central station 22 also maintains the set of predetermined data communication times. The central station 22 can include a computer-readable storage medium having an associated set of predetermined data communication times for each of the plurality of vehicles served thereby. The computer-readable storage medium can include an electronic storage medium such as a memory, a magnetic storage medium such as a magnetic disk, or an optical storage medium such as an optical disk.

As indicated by block 206, the method includes a step of directing the mobile telephone 24 to be powered at the predetermined data communication time. In this step, the controller 40 generates a control signal to initiate the mobile telephone 24 to be powered. The mobile telephone 24 can be powered by the vehicle battery or by a mobile telephone battery.

As indicated by block 212, a step of receiving the data call to the second telephone number is performed by the mobile telephone 24. The data call is received by the mobile telephone 24 while being temporarily powered during the first vehicle security mode. The data call provides a bi-directional communication link between the central station 22 and the mobile station 20 for communicating data, and optionally audio voice signals.

As indicated by block 214, a step of directing the mobile telephone 24 to automatically answer the data call is performed. The controller 40 generates a signal to the mobile telephone 24 to automatically answer the call. Since the second telephone number is active, calls to the first telephone number are not automatically answered.

As indicated by block 216, the method includes a step of directing the mobile telephone 24 to communicate data to the central station 22 in the data call. The data can include vehicle data and/or positioning data generated using the sensors 42 and/or the positioning system 44. Preferably, the data comprise vehicle positioning data and/or theft reporting data.

As indicated by block 218, an optional step of directing the mobile telephone 24 to communicate audio signals in the call can be performed. This step can be directed in dependence upon a status of the vehicle. For example, based upon the status, the mobile telephone 24 can be directed to communicate voice signals in addition to data signals. The voice signals can provide silent audio monitoring by the central station 22 of audible events within the vehicle (e.g. a listen-in mode). Further, the voice signals can be two-way to allow two-way voice communication between the central station 22 and the vehicle.

Upon completing the data call, a step of directing the mobile telephone 24 to be unpowered, or powered off, is performed, as indicated by block 220. In this step, the controller 40 generates a control signal to direct at least a portion of, and preferably an entire portion of the transceiver 26 to be unpowered. Components of the mobile telephone 24 remain unpowered until subsequent data communication with the central station 22 is to be performed, or until the mobile telephone 24 is powered on for use by an occupant of the vehicle. Hence, the steps indicated by blocks 204, 206, 212, 214, 216, 218, and 220 can be repeated one or more times while in the first vehicle security mode.

As indicated by block 222, the method includes a step of determining if a second vehicle security mode is initiated. Preferably, the second vehicle security mode comprises a vehicle-attended mode, or an alternative unarmed or deactivated alarm mode. The second vehicle security mode can be initiated by receiving a corresponding user action, such as depressing one or more buttons in accordance with a personal identification number, from the user input device 74 or another input device.

If the second vehicle security mode is initiated, a step of directing the mobile telephone 24 to make the first telephone number active is performed, as indicated by block 224. The controller 40 communicates a control signal to the mobile telephone 24 to perform this step. If the second telephone number was previously active, this step acts to automatically direct the mobile telephone 24 to switch from the second telephone number to the first telephone number.

In the second vehicle security mode, the end user can use the mobile telephone 24 for standard voice mode telephone communications and service-specific communications. In these cases, the mobile telephone 24 communicates using the first telephone number. Hence, the end user can receive voice calls using the first telephone number without having those calls automatically answered. Further, since the first telephone number is active, calls from the central station 22 to the second telephone number are not recognized by the mobile telephone 24 when in the second vehicle security mode.

Flow of the method is then directed back to block 200. The first telephone number remains active until a user-initiated activation of the first vehicle security mode is performed.

Preferably, the aforementioned method does not prevent or preclude the initiation of a security call from the mobile station 20 to the central station 22 using the second telephone number. An embodiment of a method wherein a security call is initiated using the second telephone number is described with reference to FIG. 3.

Figure 3:
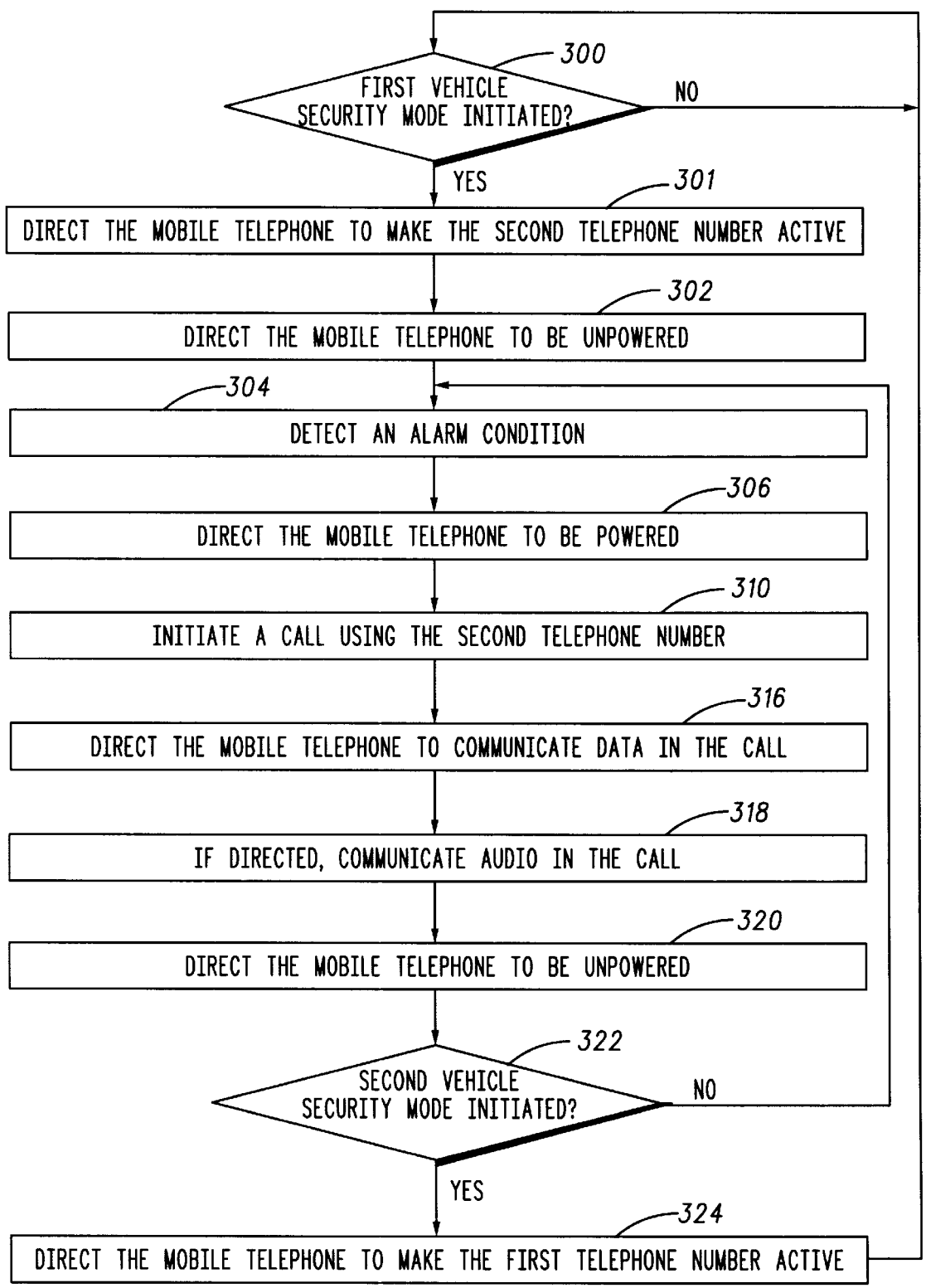
FIG. 3 is a flow chart of an embodiment of another method performed by the mobile station.

FIG. 3 is a flow chart of an embodiment of another method performed by the mobile station 20. Although the method is described with reference to elements of FIG. 1, the method can be performed using alternative elements.

As indicated by block 300, the method includes a step of determining if a first vehicle security mode is initiated. This step can be performed as described with reference to block 200 in FIG. 2.

In the first vehicle security mode, a step of directing the mobile telephone 24 to make the second telephone number its active telephone number is performed as indicated by block 301. This step can be performed as described with reference to block 201 in FIG. 2

As indicated by block 302, the controller 40 directs that components of the mobile telephone 24 be unpowered. This step can be performed as described with reference to block 202 in FIG. 2.

As indicated by block 304, a step of detecting an alarm condition is performed. The alarm condition can be sensed using any of the sensors 42 described with reference to FIG. 1. The alarm condition can be sensed, for example, in response to theft or other unauthorized use of the vehicle.

As indicated by block 306, the method includes a step of directing the mobile telephone 24 to be powered in response to the alarm condition. In this step, the controller 40 generates a control signal to initiate the mobile telephone 24 to be powered. The mobile telephone 24 can be powered by the vehicle battery or by a mobile telephone battery.

As indicated by block 310, a step of placing a security call using the second telephone number is performed by the mobile telephone 24. The security call is placed by the mobile telephone 24 while being temporarily powered during the first vehicle security mode.

As indicated by block 316, the method includes a step of directing the mobile telephone 24 to communicate data to the central station 22 in the security call. The data can include vehicle data and/or positioning data generated using the sensors 42 and/or the positioning system 44. Preferably, the data comprise vehicle positioning data and/or theft reporting data.

As indicated by block 318, an optional step of directing the mobile telephone 24 to communicate audio signals in the call can be performed. This step can be directed in dependence upon the status of the vehicle. For example, based upon the status, the mobile telephone 24 can be directed to communicate voice signals in addition to data signals. The voice signals can provide silent audio monitoring by the central station 22 of audible events within the vehicle. Further, the voice signals-can be two-way to allow two-way voice communication between the central station 22 and the vehicle.

Upon completing the call, a step of directing the mobile telephone 24 to be unpowered is performed, as indicated by block 320. In this step, the controller 40 generates a control signal to direct at least a portion of, and preferably an entire portion of the transceiver 26 to be unpowered. Components of the mobile telephone 24 remain unpowered until subsequent communication with the central station 22 is to be performed, or until the mobile telephone 24 is powered for use by an end user. Hence, the steps indicated by blocks 304, 306, 310, 316, 318, and 320 can be repeated one or more times while in the first vehicle security mode.

As indicated by block 322, the method includes a step of determining if a second vehicle security mode is initiated. Preferably, the second vehicle security mode comprises a vehicle-attended mode, or an alternative unarmed or deactivated alarm mode. The second vehicle security mode can be initiated by receiving a corresponding user action, such as depressing one or more buttons in accordance with a personal identification number, from the user input device 74 or another input device.

If the second vehicle security mode is initiated, a step of directing the mobile telephone 24 to make the first telephone number its active telephone number is performed (as indicated by block 324). The controller 40 communicates a control signal to the mobile telephone 24 to perform this step. If the second telephone number was previously active, this step acts to automatically direct the mobile telephone 24 to switch from the second telephone number to the first telephone number. In the second vehicle security mode, the end user can use the mobile telephone 24 for standard telephone communications and service-specific communications.

Flow of the method is directed back to block 300. The first telephone number remains active until a user-initiated activation of the first vehicle security mode is performed.

Although described with reference to a vehicle security system, it is noted that the herein-described methods and systems can be used in other security applications including, but not limited to, home security applications.

Thus, there has been described herein several embodiments including preferred embodiments of a method and apparatus for data communication using a multi-number mobile telephone.

Because the various embodiments of the present invention switch operation from a first telephone number to a second telephone number to receive data calls, they provide a significant improvement in reducing the likelihood of an occupant of the vehicle answering a data call and the likelihood of a non-data, or voice, call being automatically answered. This capability reduces cost charged to the user because calls are not improperly answered. Moreover, using GPS clocks to time the powering-on and powering-off of the on-vehicle mobile station 20 results in more optimum energy preservation than in prior art schemes.

What is claimed is:

1. An apparatus comprising:
   a vehicle monitoring apparatus having a controller to automatically direct a mobile telephone to switch operation from a first telephone number to a second telephone number to receive and to automatically answer a data call to the second telephone number during a vehicle-unattended mode, the controller to direct the mobile telephone to be powered at a predetermined time prior to receiving the data call and to be unpowered after completing the data call, the controller to direct the mobile telephone to communicate vehicle positioning data in the data call, the controller to direct the mobile telephone to switch from the second telephone number to the first telephone number for a vehicle-attended mode.

2. The apparatus of claim 1, wherein the controller directs the mobile telephone to communicate vehicle data in the data call.

3. The apparatus of claim 1, wherein the data call to the second telephone number is received during a first vehicle security mode of the controller.

4. The apparatus of claim 3, wherein the first vehicle security mode includes the vehicle-attended mode.

5. The apparatus of claim 3, wherein the controller directs the mobile telephone to switch from the second telephone number to the first telephone number for a second vehicle security mode of the controller.

6. The apparatus of claim 1, wherein the controller directs the mobile telephone to automatically answer the data call.

7. The apparatus of claim 1, wherein the mobile telephone includes a cellular telephone having a multi-number assignment module defining the first telephone number and the second telephone number.

8. The apparatus of claim 1, wherein the controller directs the mobile telephone to communicate audio voice information in the data call.

9. A method comprising:
   providing a vehicle monitoring apparatus having a controller;
   automatically directing a mobile telephone to switch operation from a first telephone number to a second telephone number to receive and to automatically answer a data call to the second telephone number during a vehicle-unattended mode;
   the controller directing the mobile telephone to be powered at a predetermined time prior to receiving the data call and to be unpowered after completing the data call;
   the controller directing the mobile telephone to communicate vehicle positioning data in the data call; and
   the controller directing the mobile telephone to switch from the second telephone number to the first telephone number for a vehicle-attended mode.

10. The method of claim 9, further comprising directing the mobile telephone to communicate vehicle data in the data call.

11. The method of claim 9, wherein the data call to the second telephone number is received during a first vehicle security mode.

12. The method of claim 11, wherein the first vehicle security mode includes the vehicle-unattended mode.

13. The method of claim 11, further comprising directing the mobile telephone to switch from the second telephone number to the first telephone number for a second vehicle security mode.

14. The method of claim 9, further comprising the controller directing the mobile telephone to automatically answer the data call.

15. The method of claim 9, wherein the mobile telephone includes a cellular telephone having a multi-number assignment module defining the first telephone number and the second telephone number.

16. The method of claim 9, further comprising directing the mobile telephone to communicate audio voice information in the data call.

* * * * *